(12) United States Patent
Thomas et al.

(10) Patent No.: US 10,282,761 B2
(45) Date of Patent: May 7, 2019

(54) SYSTEMS AND PROCESSES FOR DETECTING CONTENT BLOCKING SOFTWARE

(71) Applicant: comScore, Inc., Reston, VA (US)

(72) Inventors: Charles Thomas, Reston, VA (US); Paul Barford, Reston, VA (US)

(73) Assignee: comScore, Inc., Reston, VA (US)

( * ) Notice: Subject to any disclaimer, the term of this patent is extended or adjusted under 35 U.S.C. 154(b) by 226 days.

(21) Appl. No.: 15/352,576

(22) Filed: Nov. 15, 2016

(65) Prior Publication Data

US 2018/0137544 A1 May 17, 2018

(51) Int. Cl.
*G06F 21/55* (2013.01)
*G06F 21/57* (2013.01)
*G06Q 30/02* (2012.01)
*H04L 29/06* (2006.01)

(52) U.S. Cl.
CPC ....... *G06Q 30/0277* (2013.01); *G06F 21/554* (2013.01); *H04L 63/101* (2013.01); *G06F 21/57* (2013.01)

(58) Field of Classification Search
None
See application file for complete search history.

(56) References Cited

U.S. PATENT DOCUMENTS

| 2005/0191997 | A1* | 9/2005 | Spearman | H04L 51/12 455/418 |
| 2010/0049606 | A1 | 2/2010 | Trzybinski et al. | |
| 2012/0150965 | A1* | 6/2012 | Wood | H04L 51/12 709/206 |
| 2013/0097670 | A1* | 4/2013 | Walton | G06F 17/30902 726/3 |
| 2014/0330794 | A1* | 11/2014 | Dellenbach | H04L 67/2833 707/692 |
| 2015/0234876 | A1* | 8/2015 | Chandrasekhar | G06F 17/30327 707/737 |
| 2017/0353476 | A1 | 12/2017 | Gordon et al. | |

* cited by examiner

*Primary Examiner* — Brian Whipple
(74) *Attorney, Agent, or Firm* — Baker & Hostetler LLP

(57) ABSTRACT

A process of detecting an implemented blacklist may include downloading data from at least one blacklist. The process may also include compiling a list of image elements from the at least one blacklist based on a feature of the image elements, and selecting an image element from the list of image elements. The process may further include receiving a report indicative of the selected image successfully loading while a webpage is loaded on a web browser of a client device, and analyzing the report based on an expected response of the web browser to detect the implemented blacklist of the at least on blacklist.

17 Claims, 6 Drawing Sheets

SYSTEMS AND PROCESSES FOR DETECTING CONTENT BLOCKING SOFTWARE

TECHNICAL FIELD

The present disclosure relates generally to systems and processes for detecting content blocking software, and more particularly, to systems and processes for detecting ad blocking software installed in web browsers.

BACKGROUND

Content blocking software (e.g., advertisement blocking software) is gaining in popularity with the increase in advertising online. Such software can block advertisements in different ways. For example, browser plugins exist to prevent calls to content servers (e.g., third party advertisement content servers) when users render a page in a browser or an app. While some users see content blocking software as a way to improve their browsing experience, such software has a direct, negative financial impact on web/app publishers by reducing advertising opportunities. As a result, publishers have a need for processes and systems for detecting, characterizing, and/or responding to the content blocking software.

SUMMARY

The foregoing needs are met, to a great extent, by the systems and processes described herein. In one aspect, a process of detecting an implemented blacklist may include downloading data from at least one blacklist. The process may include compiling a list of image elements from the at least one blacklist based on a feature of the image elements, and selecting an image element from the list of image elements. The process may further include receiving a report indicative of the selected image successfully loading while a webpage is loaded on a web browser of a client device, and analyzing the report based on an expected response of the web browser to detect the implemented blacklist of the at least on blacklist.

Another aspect is directed to a system comprising at least one process and at least one memory. The at least one memory may store instructions that, when executed, cause the processor to download data from at least one blacklist, and compile a list of image elements from the at least one blacklist based on a feature of the image elements. The instructions may also cause the processor to select an image element from the list of image elements, and receive a report indicative of the selected image element successfully loading while a webpage is loaded on the web browser of the client device. The instructions may further cause the processor to analyze the report based on an expected response of the web browser to detect an implemented blacklist of the at least one blacklist.

Yet another aspect is directed to a non-transitory computer-readable medium storing instructions which, when executed, cause one or more processors to perform a process. The process may include downloading data from at least one blacklist, and compiling a list of image elements from the at least one blacklist based on a feature of the image elements. The process may also include selecting an image from the list of image elements, and receiving a report indicative of the selected image results successfully loading while a webpage is loaded on the web browser of the client device. The process may further include analyzing the report based on an expected response of the web browser to detect the implemented blacklist of the at least one blacklist.

BRIEF DESCRIPTION OF THE DRAWINGS

In order that the disclosure may be readily understood, aspects of this disclosure are illustrated by way of examples in the accompanying drawings.

The same reference numbers are used in the drawings and the following detailed description to refer to the same or similar parts.

DETAILED DESCRIPTION

The present disclosure is generally directed to detecting the installation and/or use of content blocking software (e.g., ad blocking software). This detection accounts for the robustness and the dynamic nature of content blocking software capabilities by employing one or more tests that may be reported along with other contextual information to a central server. Data from the tests may be used to determine the response of content blocking software to different publishers. For example, blind spots of detected web browsers and/or content blocking software may be detected and/or reacted to. In response, for example, a webpage being viewed can be blocked on a user's machine and/or a request can be sent to the user to disable the content blocking software and/or make a donation. In some embodiments, the system may, additionally or alternatively, be configured to detect blacklists implemented by the content blocking software. This detection may be generally performed by compiling a list of most recently observed image elements from the blacklists, and determining if the image elements are loaded by the web browser. The detection may also be based on the frequency of observation of the image elements. Advantageously, the system does not require installation, authoring, or configuration of software on the creative provider (e.g., the web-server of the site to be measured). Therefore, no upgrades are required on the server of the creative provider, and the analysis server can upgrade the code transparently on the next page-loading. Furthermore, one of the uses of content blocking software is to prevent the operation of third party tracking tags (e.g., scorecardreseach tag of comScore™). The system of the present disclosure is configured to test whether or not such tags are being blocked simply by attempting to make a call to them during a test.

Figure 1:
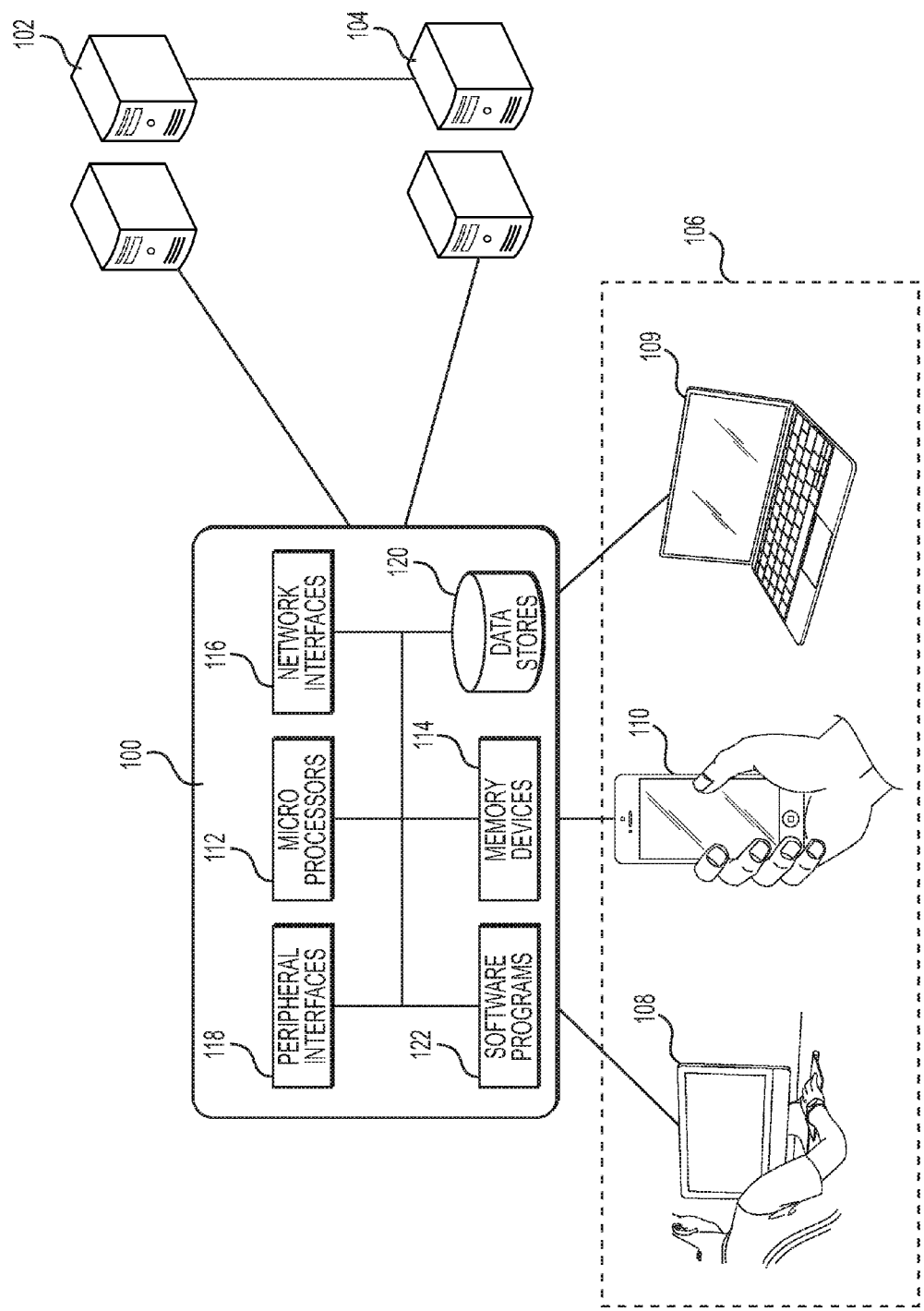
FIG. 1 illustrates an exemplary hardware and network configurations for a content provider, a creative provider, an analysis network, and client devices.

FIG. 1 illustrates exemplary hardware and network configurations for various devices that may be used to perform one or more operations of the described aspects. As shown, a content provider 100, a creative provider 102, and an analysis network 104 are in communication with one another.

The content provider 100 may be a website owner or content publisher in communication with a plurality of client devices 106. The client devices 106 may include a personal computing device, such as a desktop 108, a laptop computer 109, a mobile device 110, such as a smartphone or tablet, a kiosk terminal, a Global Positioning System (GPS) device, and/or other devices. The client devices 106 may be loaded with an operating system and a web browser configured to render webpages or other web or application content from the content provider 100. Exemplary operating systems include Microsoft Windows, Apple OS X, Linux, iOS, and Android, and exemplary web browsers include Internet Explorer, Google Chrome, Mozilla Firefox, and Safari. Accordingly, the client device 106 may receive client-side code to render a webpage from one or more external devices, such as a web server involved with serving webpages, advertisements, creative, or other information to the client device 106. For example, the client device may access HyperText Markup Language (HTML) code from the content provider 100 that provides instructions to render a desired webpage.

The HTML code may also be embedded with JavaScript that may dynamically access a creative (e.g., advertisement content) from the content provider 100 and/or the creative provider 102. The JavaScript may load advertisement content to the client device 106 without leaving a webpage, animate advertisement content (e.g., fade them in and out), and/or create interactive advertisement content. For example, the JavaScript may include a link directed to the creative provider 102 which instructs the desired size and location of the advertisement content. However, the web browsers of the client device 106 may have content blocking software installed and configured to block, modify, and/or hide the advertisement content from the rendered webpage. The installed content blocking software may detect the advertisement content based on access to a blacklist including, for example, domains, Cascading Style Sheets (CSS) style names, and/or popup servers indicated to be blocked. For example, the content blocking software may access and implement one or more blacklists to block renderings of the listed elements. One or more of the implemented blacklists may be unique to each of the installed content blocking software and/or web browsers. Therefore, the content blocking software and/or web browser may be detected and/or characterized based on the implemented blacklist.

The HTML code may also include JavaScript of coding or instructions (e.g., a tag) that scans and/or tracks objects that are displayed by the web browsers. The tag may be encoded in a PHP script that is initially forwarded from the analysis network 104 to the content provider 100 to be incorporated into the web page displayed on the client device 106. The tag may forward the results of the scans back to the analysis network 104. The tag may be configured to detect and/or characterize content blocking software and/or accessed blacklists. For example, the tag may scan the HTML code of the web page to determine characteristics of objects that are received and/or originally coded. The tag may also scan the web page to determine how the objects are rendered and/or how the objects are made visible on the webpage. For instance, the tag may be configured to scan the HTML code to determine the intended size of an object and/or scan the webpage to determine the actual rendered size of the object. The tag may be configured to detect whether a "hidden" attribute of rendered objects was set to "true." The tag may also be configured to detect the source of JavaScript of the HTML coding, for example, to detect scripts from adsby-google. The tag may further be configured to detect classnames of objects elements of the webpage. The tag may be hidden from a user of the client device 106. In some instances, the tag used to call the test script may be blocked. For example, the tag may be on a blacklist and not wind up being called. Therefore, the system may use obscure codes for tag names and periodically change the names. This may make it difficult for entities that produce the content blocking blacklists to keep up.

The creative provider 102 may be a company seeking to market or sell products or services, or an advertisement agency or broker that may direct creatives (e.g., advertisement content) to the content provider 100. The creative provider 102 may publish advertisement content to client devices 106 based on cookies detailing a user's web behavior. For example, the creative provider 102 may include servers from Google AdSense that facilitates targeted publication of advertisement content to users. In some embodiments, the advertisement content may be generated by JavaScript linked and/or embedded in a predetermined location of the webpage. The advertisement content may be in the form of, for example, web banners, pop-up ads, floating ads, expanding ads, and/or trick ads.

The analysis network 104 may include third-party servers seeking to receive information related to the creatives viewed on the client device 106. The analysis network 104 may be configured to receive results of and/or initiate one or more tests to detect the presence of content blocking software on the client device 106. For example, the analysis network 104 may be configured to send data to the client device 106 (e.g., through DIV elements and/or JavaScript) to detect the function of installed content blocking software (e.g., by the tag).

The analysis network 104 may also be configured to detect the presence of objects from the creative provider 102 and detect a response of the content blocking software. For example, the analysis network 104 may determine whether JavaScript sent from the content provider 100 and/or creative provider 102 was blocked by the content blocking software. The analysis network 104 may also detect whether the width and/or height of rendered objects was reduced or set to zero pixels. The analysis network 104 may further detect whether a "hidden" attribute of rendered objects was set to "true."

Although only the hardware configurations for the components are shown in FIG. 1, each of the content provider 100, the creative provider 102, the analysis network 104, and the client devices 106, may include microprocessors 112 of varying core configurations and clock frequencies. These entities may also include one or more memory devices or computer-readable media 114 of varying physical dimensions and storage capacities, such as flash drives, hard drives, random access memory, etc., for storing data, such as images, files, and program instructions for execution by one or more microprocessors 112. These entities may include one or more network interfaces 116, such as Ethernet adapters, wireless transceivers, or serial network components for communicating over wired or wireless media using protocols, such as Ethernet, wireless Ethernet, code divisional multiple access (CDMA), time division multiple access (TDMA), etc. These communication protocols may be used to communicate between the content provider 100, the creative provider 102, the analysis network 104, and the client devices 106. These entities may also have one or more peripheral interfaces 118, such as keyboards, mice, touchpads, computer screens, touchscreens, etc. for enabling human interaction with and manipulation of devices of the content provider 100, the creative provider 102, the analysis network 104, and the client devices 106.

The content provider 100, the creative provider 102, the analysis network 104, and the client devices 106 may each have the computer-readable media 114 physically or logically arranged or configured to provide for or store one or more data stores 120, such as one or more file systems or databases, and one or more software programs 122, which may contain interpretable or executable instructions for performing one or more of the disclosed aspects. The components may comprise any type of hardware, including any necessary firmware or software for performing the disclosed aspects. The components may also be implemented in part or in whole by electronic circuit components or processors, such as application-specific integrated circuits (ASIC) or field-programmable gate arrays (FPGAs).

Figure 2:
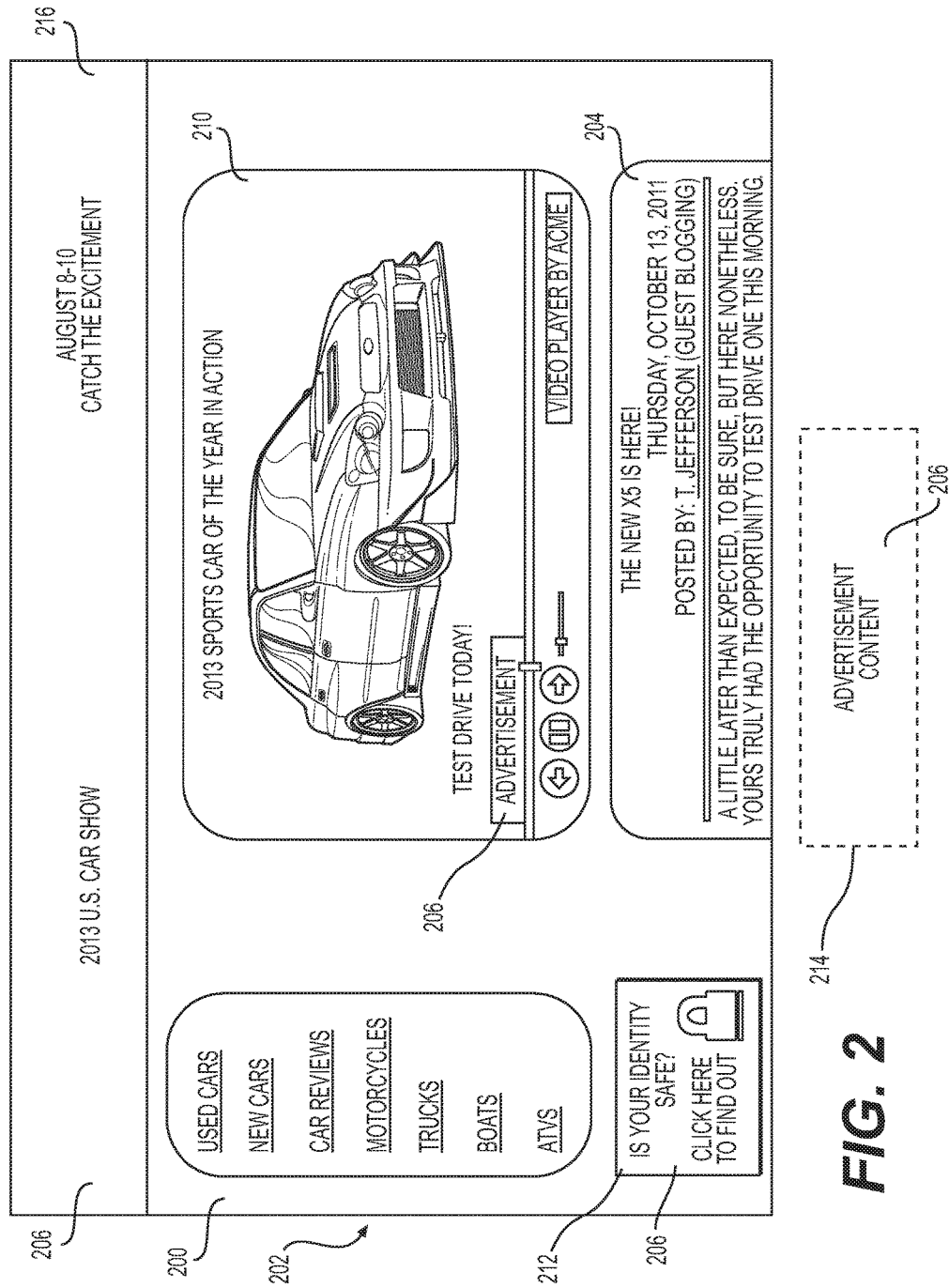
FIG. 2 illustrates an exemplary webpage of a content provider.

FIG. 2 is a diagram depicting an exemplary webpage 200 from the content provider 100 that is rendered by a web browser 202 on a client device 106. The webpage 200 may include content 204 and at least one creative 206. The creative(s) 206 may be a static advertisement, an animated advertisement, a dynamic advertisement, a video advertisement, a public service announcement, or another form of information to be displayed on a screen of the client device 106.

In order to render the creative 206, the markup language of the webpage 200 may include a creative tag associated with the desired creative 206. For example, if the webpage 200 is coded with HTML, the creative tag may be an HTML tag or JavaScript tag that links to the creative 206. The creative tag may direct the client device 106 to retrieve the creative 206 from the content provider 100 and/or the creative provider 102. It will be appreciated that the creative tag may be a series of successive links that ultimately redirect to the creative 206. As used herein, the term creative link includes both a direct link to the creative 206 as well as a series of successive links to the creative 206 through, for example, one or more advertisement networks.

Further, the webpage 200 may have instructions for embedding a video player 210 as a part of the content to be displayed on the page. The video player 210 may be configured to play video content, such as video advertisements, to open executable files, such as Shockwave Flash files, or to execute other instructions. The video player 210 may be a separate component that is downloaded and executed by the web browser 202, such as an Adobe Flash, Apple QuickTime, or Microsoft Silverlight object, a component of the web browser 202 itself, such as a HTML 5.0 video player, and/or any other type of component able to render and play video content within the web browser 202. The video player may be configured to play featured video content and/or a creative 206. The video player may also be configured to retrieve the creative 206 through a creative tag that links to the desired creative 206.

The webpage 200 may also have instructions for embedding DIV elements 212, 214. The DIV element 212, 214 may define logical divisions within the webpage 200, and may be utilized to achieve a desired structural and presentational effect. When the DIV element 212, 214 is used, the enclosed content may be defined as a specific section of the webpage 200 and may acquire styles and properties applied to the DIV element 212, 214 to help visualize the grouping of elements together. For example, the enclosed content may be formatted through CSS to control the organization and structure of the content. In some embodiments, the style of headings and text of DIV elements may be formatted to simulate advertisement content, such as being provided a name of ad-specific CSS classes commonly found on a blacklist, such as "pub_200x250" or "text-ad-links." In some embodiments, the DIV elements may, additionally or alternatively, be animated in loops with moving content. For example, the DIV elements 212, 214 may include instructions to simulate animated advertisements, interactive advertisements, pop-up advertisements, floating advertisements, expanding advertisements, and/or banner advertisements.

As further depicted in FIG. 2, the DIV elements may be either visible on the webpage 200 (e.g., DIV element 212) and/or hidden (e.g., DIV element 214). For example, setting a "hidden" attribute of the DIV element 214 to "true" may enable the analysis network 104 to detect the presence of content blocking software without affecting the visual depiction of the webpage 200.

The webpage 200 may further include instructions for embedding one or more frames elements 216 segmented from the webpage 200). In some embodiments, the frame elements 216 may be an inline frame or "iFrame." The iFrame is an HTML element that functions as a distinct web browser window embedded in the webpage 200. The frame elements 216 may retrieve data from a remote server (e.g., the creative provider 102) and render a creative 206 (e.g., advertisement content) on the webpage 200. The creative provider 102 may continually update or refresh the creative 206 distinct from the content 204 of the webpage 200. In some embodiments, the frame elements 216 may be in the form of a banner on the webpage 200, as depicted in FIG. 2.

The client device 106 and/or the web browser 202 associated with the webpage 200 may further include content blocking software (e.g., ad blocking software). Content blocking software may be configured to block, modify, and/or hide various elements of the webpage 200 based on an implemented blacklist. For example, content blocking software may attempt to modify the one or more of the DIV elements 212, 214, for example, by setting its width and/or height to zero pixels. Content blocking software may also attempt to modify the frame elements 216, for example, by setting a "hidden" attribute to "true" and/or modifying the classname field. Content blocking software may further attempt to block data/files based on its features and/or source. For example, content blocking software may attempt to block content of the DIV element 212, 214 based on its style resembling advertisement content. Content blocking software may also prevent the loading of scripts with the "ad" or "ads" in the name and/or content from sources, such as the creative providers 102 (e.g., Google AdSense).

The analysis network 104 may be configured to receive results of one or more tests on the client device 106 to determine the presence of content blocking software. The analysis network 104 may be configured to load content (e.g., JavaScript and/or HTML) onto the webpage 200 and detect any response from content blocking software. The analysis network 104 may also be configured to detect the presence of elements (e.g., frame elements 216) on the webpage 200 and determine if the elements have been hidden and/or modified. The analysis network 104 may be configured to determine the source of scripts to determine whether content blocking software is blocking, modifying, and/or hiding content based on its source.

The analysis network 104 may analyze the results of one or more of the tests in real-time or post-facto to determine the presence of content blocking software. For example, the analysis network 104 may aggregate the reports and/or separate the reports by various characteristics, such as date and/or domain. The report may include various features of the client device 106 and/or web browser 202. For example, the analysis network 104 may transmit one or more queries to the web browser 202 to determine the operating system, the browser type, and/or browser version. The analysis network 104 may also characterize the web browser 202 based on the presence and/or response of content blocking software. The analysis network 104 may detail blind spots of detected web browsers 202 and/or content blocking software. The analysis network 104 may further be configured to react in real-time, for example, by disabling or occluding the viewing of the current page, displaying a request for the user to disable the content blocking software, and/or displaying a request for the user to make a donation.

To ensure robustness and facilitate evolvability, the analysis network 104 may include a Tag Health system. For example, each function of the analysis network 104 may be run in a protected silo, and any errors may be reported back to the analysis network 104 separately in the telemetry string via an "Error Pixel" that gives an error code (e.g., indicating what function didn't run) as well as an error string giving detailed information about why the function was unable to execute. For example, each test may be run within a try/catch statement, such that if a function fails for any reason the rest of the tag functions and tests will continue to run. Additionally, any test which is not able to run correctly may generate a separate telemetry pixel with an error code (e.g., detailing where the function failed) and an error message (e.g., detailing why the function failed). The error telemetry may be analyzed post-facto to improve tag functions and use telemetry on browser type, browser version, URL, and operating system to pinpoint systems that are not running correctly. For example, the analysis of this Tag Health telemetry may allow each function to be honed and improved as necessary to cover the maximum possible user base. The Tag Health telemetry may also allow post-impression data analysis and a much wider variety of data breakouts than is possible with an in-tag analysis.

Figure 3:
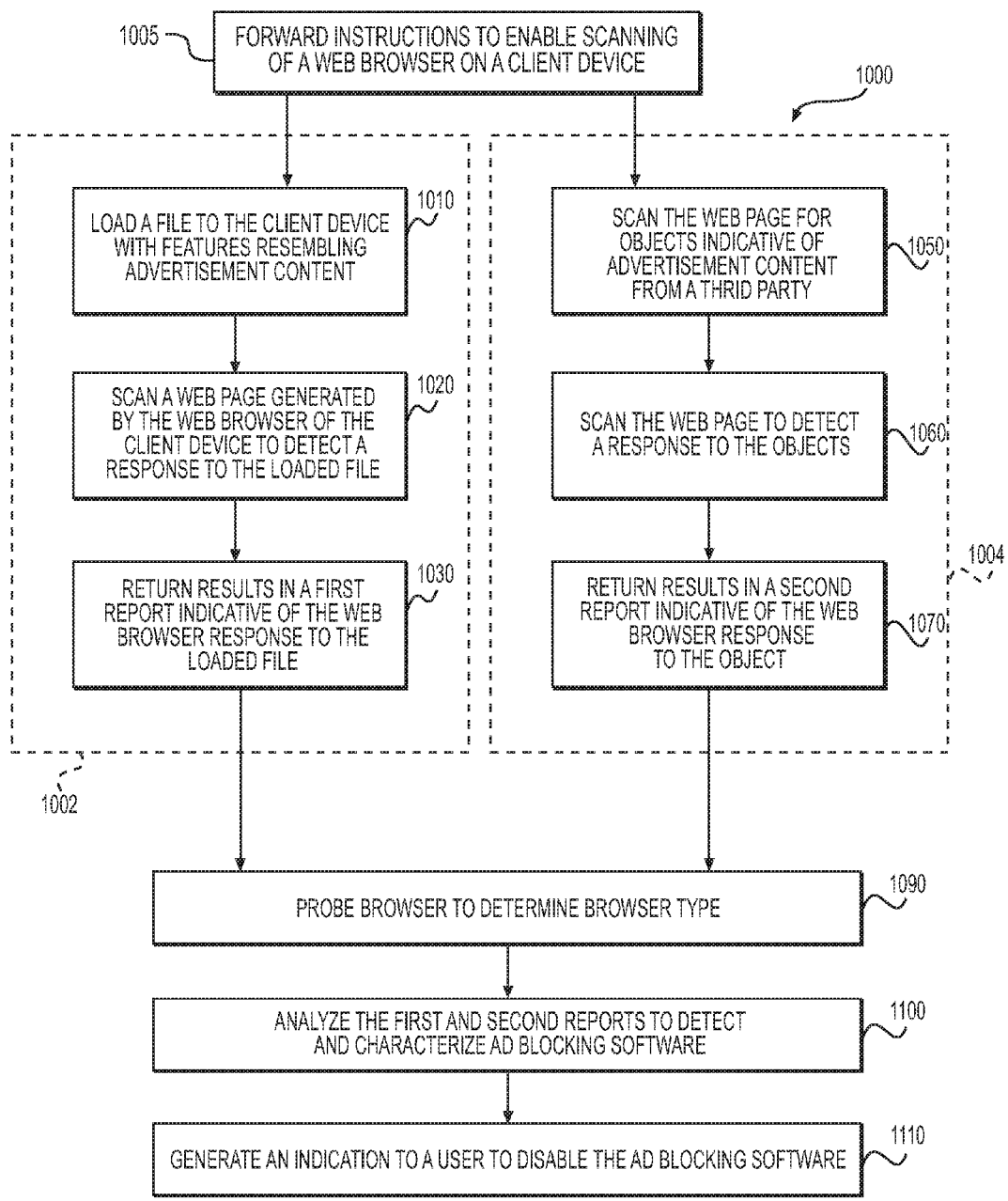
FIG. 3 illustrates an exemplary process for detecting content blocking software.
Figure 4:
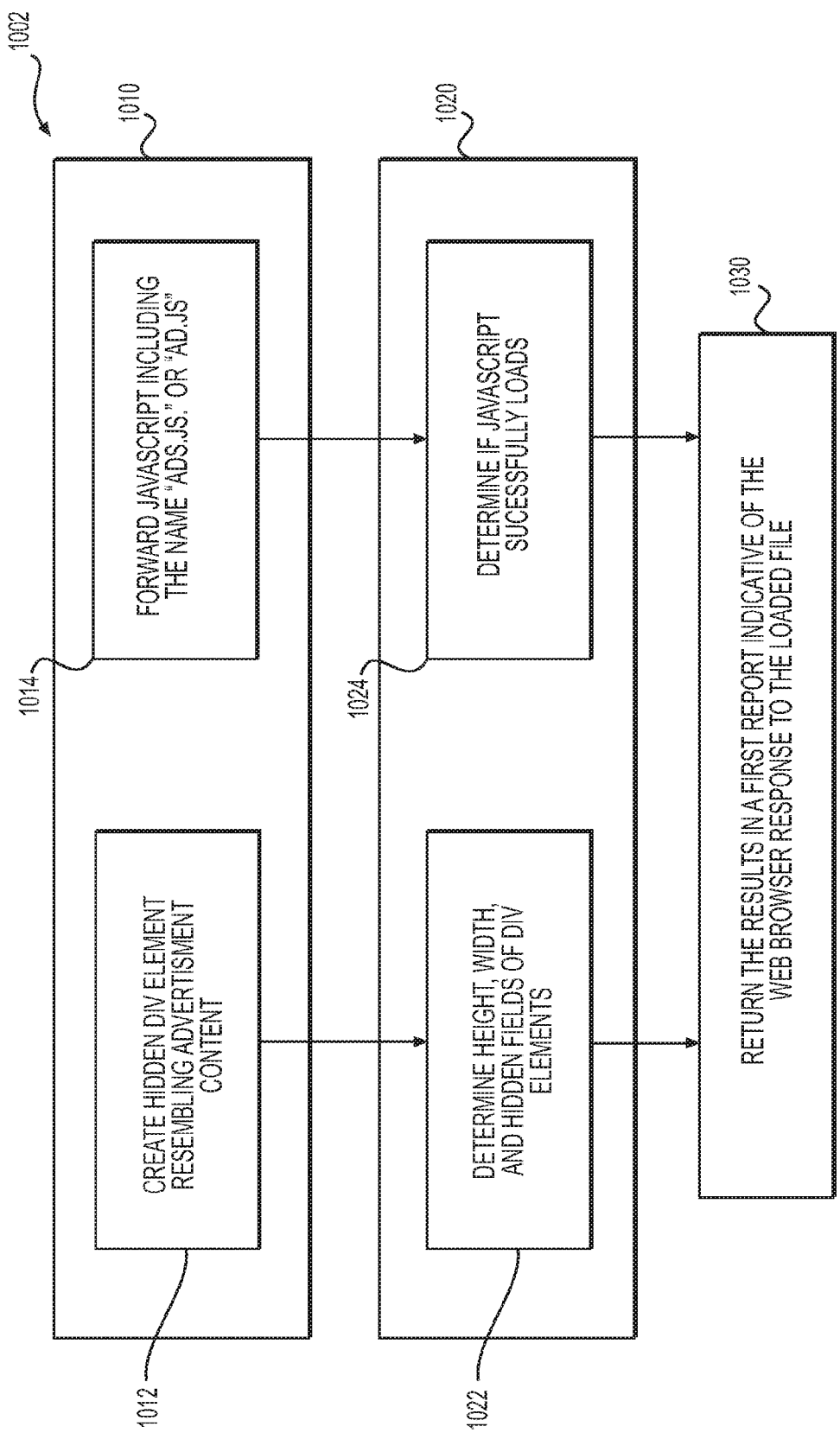
FIG. 4 illustrates embodiments of exemplary steps of the process of FIG. 3.
Figure 5:
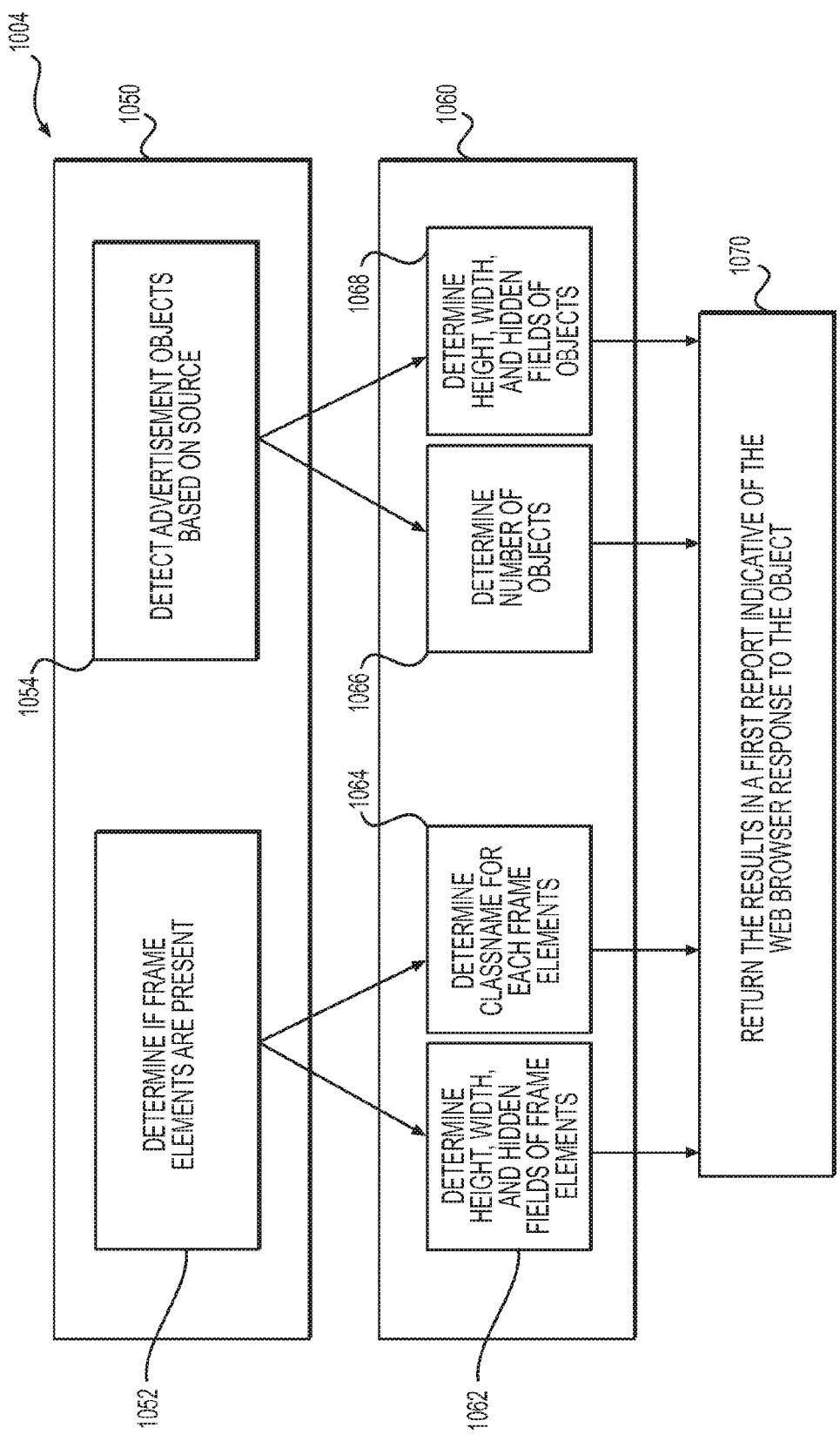
FIG. 5 illustrates embodiments of exemplary steps of the process of FIG. 3.

FIGS. 3-5 illustrate exemplary embodiments of a process 1000 for detecting content blocking software. Even though discussed as being primarily performed by the tag and the analysis network 104, one or more steps of the process 1000 may be performed, in conjunction or alternatively, by the content provider 100, creative provider 102, the analysis network 104, and/or the client device 106.

The process 1000 may include one or more first tests 1002 and/or one or more second tests 1004 that provide reports indicative of installation and/or function of content blocking software. For example, as further depicted in FIGS. 4-5, the process 1000 may include a plurality of first tests 1002 and a plurality of second tests 1004 that include separate substeps (e.g., 1012, 1014) providing robust data on the responsiveness of content blocking software. In some embodiments, the process 1000 may include six tests (e.g., two first tests 1002 and four second tests 1004), but it is contemplated that the process 1000 may include any number of first and second tests 1002, 1004 that are reported separately or in combination with one another.

As depicted in FIG. 3, in step 1005, the analysis network 104 may forward instructions (e.g., PHP script) to the content provider 102 to be loaded onto the webpage 200 accessed by the client devices 106. The PHP script may be delivered to the content provider 102 in a compressed and obfuscated fashion to improve delivery performance and to limit the ability to reverse engineer the script. The PHP script may assemble a Javascript telemetry tag on-the-fly, such that a new tag may be assembled per page load. Once assembled and delivered to the web browser, the Javascript may run based on internal variables and objects to keep track of functions and results, performing first and second tests 1002, 1004 to detect and characterize content blocking software and/or implemented blacklists.

In some embodiments, the tag may be targeted to one or more selected client devices 106. For example, the tests 1002, 1004 may be performed on client devices 106 of uniform samples of users that request access to the webpage 200. The uniform samples may be based on demographic data of the clients (e.g., age, race, sex, and/or economic status) obtaining uniform sets of data while reducing the overhead associated with the system.

In some embodiments, the tag may be initiated using a domain name that been generated at random. This may make it more difficult for content blocking software to identify and blacklist these domain names thereby enhancing the integrity and sustainability of the tests 1002, 1004. The random domain names also make blacklisting of the telemetry-gathering domain by AdBlockers more difficult, less effective, and therefore make it less likely that an AdBlocker would try to blacklist the telemetry domain.

As depicted in FIG. 3, the first tests 1002 may include step 1010, where the analysis network 104 forwards a file to the client device 106 with features resembling advertisement content. The files from the analysis network may be directly forwarded to the client device 106 or via an intermediary, such as the content provider or 100, creative provider 102, or other third party.

As further depicted in FIG. 4, step 1010 may include substep 1012, where the tag creates the hidden DIV element 214 having objects resembling advertisement content to detect the presence of content blocking software. For example, the DIV element 214 may be styled via CSS and include animated objects that are looped several times at intervals. Step 1010 may also include substep 1014, where the tag attempts to load a JavaScript file having a name including "ad.js" and/or "ads.js." The names "ad.js" and "ads.js" are provided on a number of different blacklists, and are often blocked by content blocking software. Each of the substeps 1012, 1014 may initiate separate first tests 1002, as depicted by parallel processes in FIG. 4.

In step 1020, the tag may scan the webpage (e.g., the webpage 200) generated by the web browser 202 of the client device 106 in response to the loaded file. In some embodiments, step 1020 may include substep 1022, where the tag scans the webpage 200 to determine if a height, a width, and/or a hidden field of the DIV element 214 of substep 1010 has been modified. For example, the tag may measure the pixels of the rendered DIV element 214 to determine if they have been set to zero. Step 1020 may also include substep 1024, where the tag determines if the JavaScript of substep 1014 successfully loads. Substeps 1012-1022 and 1014-1024 may be repeated one or more times varying locations and/or script to provide a more detailed report of content blocking software. For example, substep 1012 may be performed successively with visible DIV element 212 and/or hidden DIV element 214 having various styles and positioned in various locations. Similarly, substep 1014 may be repeated with various different names including "Ad" and/or "Ads."

In step 1030, the tag may return the results in a first report to the analysis network 104 indicative of the web browser response of the loaded file. The first reports may include a time/date stamp, IP address, website/webpage visited, domain, and/or test details, such as the file that was loaded in step 1010 and the response of the web browser 202 in step 1020.

The one or more second tests 1004 may be performed simultaneously and/or successively of the one or more first tests 1002. In step 1050, the analysis network 104 may receive results of a scan the webpage 200 for objects indicative of advertisement content from a third party (e.g., the creative provider 102). For example, the results of the scan may be performed by the tag and forwarded to the analysis network 104. In some embodiments, as further depicted in FIG. 5, step 1050 may include substep 1052, where the analysis network 104 receives results of a scan of the webpage 200 to determine if frame elements 216 (e.g., iFrames) are present. Step 1050 may also include substep 1054, where the analysis network 104 receive results of a scan of the webpage 200 to detect advertisement content based on source (e.g., from the creative provider 102). For example, the analysis network 104 may detect the presence of creative tags (e.g., scripts from adsbygoogle) directed to creatives 206 provided by one or more creative providers 102 (e.g., Google AdSense).

In step 1060, the tag may scan the webpage 200 to determine a response of the webpage 200 to the objects of step 1050. In some embodiments, as further depicted in FIG. 5, step 1060 may include substeps 1062-1068 based on the detected objects of substeps 1052-1054. In substep 1062, the tag may determine if a height, a width, and/or a hidden field of the frame elements 216 have been modified. In substep 1064, the tag may determine the classname for each frame element 216. The classname is an element that may be modified by content blocking software. Therefore, comparing the determined classname to an expected classname may improve the detection and/or characterization of the content blocking software. In substep 1066, the tag may determine the number of advertisement objects of substep 1054. In substep 1068, the tag may determine if a height, a width, and/or a hidden field of the advertisement objects of substep 1054 have been modified. Each of the substeps 1062-1068 may provide separate second tests 1004, as depicted by parallel processes in FIG. 5.

In step 1070, the tag may return the results to the analysis network 104 in a second report indicative of the response of the web browser 202 in the second tests 1004. Step 1070 may be performed in a similar manner as step 1030. For example, the second reports may include a time/date stamp. IP address, website/webpage visited, domain, the test details of step 1060, and/or the response of the web browser 202 in step 1020.

In step 1090, the tag may probe the browser of the client device 106 and return the results to the analysis network 104 to determine the browser type. For example, implied browser versioning (IBV) may be performed to determine the type and version of browser installed. The tag may check for the existence of functions and data storage objects. For example, Firefox implements the functions "Map.clear", "Map.iterable", and "InstallTrigger". No other browser may perform these functions, so if the present functions are being performed and detected, then the analysis network 104 may determine that the browser is Firefox. On the other hand, if "document.layers" is detected, analysis network 104 may determine that the browser is Netscape. Accordingly, the analysis network 104 may strategically ask the web browser 202 one or more conditional questions that elicit a response from the web browser 202 that cannot be fabricated. The analysis network 104 may then receive the response from the web browser 202 and compare the response to an array of known browser responses. The comparison of the response received from the web browser 202 with the known browser responses may indicate the operating system, the browser type, and/or the browser version of the web browser 202. For example, the analysis network 104 may determine the operating system of the client device 106 is Microsoft Windows 10 and the web browser 202 is Microsoft Internet Explorer 5.0. This can be compared to the type and version of browser reported and can be useful when combined with the data of the first and/or second report(s). For example, the analysis network 104 may determine the response specific to the web browser 202 (e.g., Microsoft Internet Explorer 5.0). The analysis network 104 may characterize the web browser 202 based on the response to the content blocking software and compile the characterization in a database. The characterization of the web browser 202 may enable creative providers 102 to avoid content blocking software based on the specific operating system, the browser type, and/or the browser version.

In step 1100, the analysis network 104 may determine the characteristics of any installed content blocking software based on analysis of one or more of the first and/or second reports. For example, the analysis network 104 may compile the first and/or second reports and analyze the reports to determine the response of content blocking software. The analysis network 104 may parse through the data of the tests 1002, 1004 to compile detailed information of errors indicative of content blocking software. The compilations may include "error pixels" that provide an error code indicating which of the first tests did not run, as well as an error string giving detailed information about why the function was unable to execute. The error pixels may detail how content blocking software responds to the files loaded in step 1010. For example, the error pixels may detail how content blocking software responds to the hidden DIV elements 214 loaded in substep 1012 and/or the JavaScript loaded in substep 1014. In some instances, the content blocking software may respond to animated DIV elements and not static DIV elements. On the other hand, the content blocking software may respond to visible DIV element 212 and not hidden DIV element 214. The error pixels may indicate the presence and/or response of content blocking software, by comparing the expected display of the objects of substeps 1052-1054 to the actual display of substeps 1062-1068. For example, if a frame element 216 was coded to have dimensions of 50 pixels by 100 pixels and at least one of the dimensions was set to zero, the analysis network 104 may determine that content blocking software is installed and responds to that type of object in that specific location of the webpage 200. Therefore, through the one or more tests 1002, 1004, the system may provide a robust characterization of any installed content blocking. This characterization may be used by the creative provider 102 to generate creatives based on blind spots of the content blocking software. Furthermore, due to the complex nature and/or quantity of the tests 1002, 1004, the analysis network 104 may characterize the fingerprint of the content blocking software, such that the analysis network 104 may not only determine the presence of content blocking software, the analysis network 104 may determine which content blocking is present. The analysis network 104 may compile data and characterize the presence and nature of content blocking software on versions web browsers 202 and/or webpages 200. The more blacklists tested against, the better the analysis network 104 may determine the presence and/or characterize any installed AdBlocker(s) (e.g., "AdBlocker Fingerprinting").

For example, the analysis network 104 may determine that 65% of client devices 106 using Google Chrome Version 49.0.2623.108 had content blocking software installed based on at least one of the first and/or second reports. The analysis network 104 may also, for example, determine that 45% of the users visiting ESPN's website had content being blocked. The analysis network 104 may aggregate demographic data, such as age, race, sex, and/or economic status. For example, the analysis network 104 may tie results of the tests 1002, 1004 to demographic information on clients that may reside in other repositories to enable reports on demographics of ad block users. The demographic data may be obtained through a third party lookup system to retrieve an identifier of the client device 106. The detected content blocking software of the web browsers 202 and/or webpages 200 may be characterized based on the response of different types of objects. The analysis network 104 may further detail and compile blind spots for the content blocking software of the detected web browser 202. For example, the analysis network 104 may determine that the content blocking software minimizes frame elements 216, but does not respond to hidden DIV elements 214. The analysis network 104 may also determine that the content blocking software blocks JavaScript with "Ad" in the name, but not "Ads." The blind spots determination may be useful for content providers 100 and/or creative providers 102 in developing content 204 and creatives 206 that are not blocking by content blocking software.

In step 1110, the analysis network 104 may react in real-time to detected content blocking software. For example, as indicated in FIG. 3, the analysis network 104 may generate an indication to be displayed on the client device 106 to disable the content blocking software. For example, an interstitial display option (e.g., blocking content display until the content blocking software is deactivated) may run from the tag (not via page redirects or other sever-side methods). In some embodiments, the analysis network 104 may optionally automatically disable the content blocking software in step 1110. The analysis network 104 may, additionally or alternatively, generate an indication to be displayed on the client device 106 to make a donation. The system may also display the data to a user, for example, in a summarized or reduced version.

Figure 6:
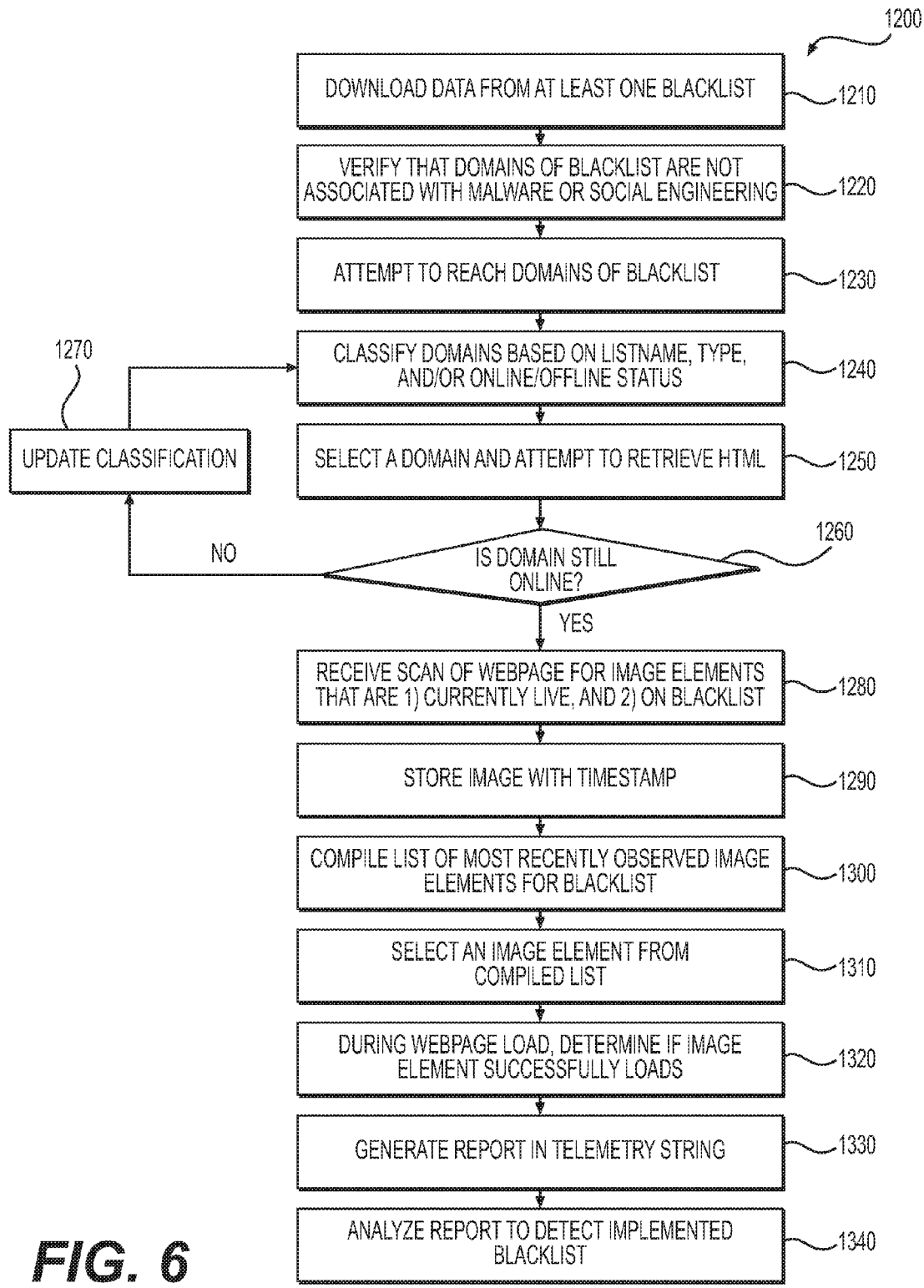
FIG. 6 illustrates an exemplary process for detecting an implemented blacklist.

FIG. 6 illustrates exemplary embodiments of a process 1200 for detecting an implemented blacklist. Even though discussed as being performed primarily performed by one of the tag and the analysis network 104, one or more steps of the process 100 may be performed, in conjunction or alternatively, by the content provider 100, creative provider 102, the analysis network 104, and/or the client device 106. The process 1200 may be performed in conjunction with the process 1000.

The process 1200 may be performed by the tag of step 1005. For example, the analysis network 104 may forward instructions (e.g., PHP script) to the content provider 102 to be loaded onto the webpage 200 accessed by the client devices 106. The PHP script may be delivered to the content provider 102 in a compressed and obfuscated fashion to improve delivery performance and to limit the ability to reverse engineer the script. The PHP script may assemble a Javascript telemetry tag on-the-fly, such that a new tag may be assembled per page load. Once assembled and delivered to the web browser, the Javascript may run based on internal variables and objects to keep track of functions and results, to perform one or of the steps 1210-1340, as discussed below.

In step 1210, the analysis network 104 may download data from at least one blacklist. For example, the analysis network 104 may download data from a plurality of free and/or commercial URLs providing data on domains, CSS style names, and/or popup servers that are indicated to be content to be blocked. The data in the blacklist may be updated frequently, so step 1210 may be intermittently or continuously performed to acquire additional data from the backlists.

In step 1220, the analysis network 104 may verify that the domains of the at least one blacklist are not associated with malware or social engineering. The verification may prevent entities (e.g., Google) from listing the analysis network 104 as malware when the analysis network 104 attempts to pull image element from domains that Google has found to be Malware-associated.

In step 1230, the analysis network 104 may attempt to reach domains from the at least one blacklist. For example, the analysis network 104 may attempt to reach each domain from the blacklist to determine the online/offline status of the domains. The online/offline status may enable the analysis network 104 to determine which blacklists the content blocking software is currently implementing, reducing the required processing bandwidth. In step 1210 and/or 1230, the analysis network 104 may also determine the type and/or content of the at least one blacklist. For example, the analysis network may determine if the blacklist generates pop-up ads and/or DIV elements. The analysis network may also determine the content of the blacklist, such as if the domain is directed to news, religion, retail, dating, adult content, and/or finance. In step 1240, the analysis network 104 may aggregate the data from steps 1210, 1230 and classify the domains, for example, by listname, type, content, and/or online/offline status.

In step 1250, the analysis network 104 may select a domain and attempt to retrieve HTML from the domain. For example, the analysis network 104 may select a domain with an "online" status and attempt retrieve the HTML from the selected domains. The analysis network 104 may perform this step, for example, several times a day in order to acquire data and maintain the data from step 1240 up to date.

In step 1260, the analysis network 104 may determine if the domain is still online (e.g., available). If the domain is not online ("No" step 1260), the analysis network may update the classifications in step 1270. If the domain is available ("Yes", step 1260), the analysis network may proceed to step 1280.

In step 1280, the analysis network 104 may receive a scan of a loaded webpage for image elements that are currently live and on the at least one blacklist. The tag may scan the webpage for the image elements and report back to the analysis network in a telemetry string indicating the image elements that are currently live and on at least one blacklist. The tag may also acquire the location of the image element and/or a timestamp of when the image element was observed.

In step 1290, the analysis network 104 may store the observed image elements of step 1280 with the timestamp. The analysis network 104 may also compile frequency data based on the number of observations of the image elements and the timestamps. For example, the analysis network 104 may compile frequency data to determine how often each of the image elements is being observed over a predetermined timeframe.

In step 1300, the analysis network 104 may compile a list of most recently observed image elements for the at least one blacklist. For example, the analysis network 104 may compile the list based on one or more features of the image elements. The feature may be based on the image element being observed. This may reduce the required processing bandwidth by narrowing down later analysis based on image elements of active blacklists. In some embodiments, the feature may be further based on the timestamp being within a predetermined timeframe. For example, the list may be compiled based on the image element being observed within the past 24 hours. This feature may even further reduce the processing bandwidth by narrowing the later analysis based on the most recent processes of the blacklist. The compiled list may be updated, continuously or intermittently, in order to ensure the recognition of the most recently observed image elements from the blacklists. In some embodiments, the feature and the compiled list may, additionally or alternatively, be based on the frequency data of observations of the image element. For example, the compiled list may be based on the image element being observed at least 100 times over the past 24 or 48 hours.

In step 1310, the analysis network 104 may select an image element from the compiled list of step 1300 for the at least one blacklist. In some embodiments, one or more of the image elements may be selected from the compiled list at random. The number of image elements selected in step 1310 may be substantially less than the number of image elements of the compiled list.

In step 1320, the tag may determine if the selected image element of step 1310 successfully loads during a webpage load. In step 1330, the tag may generate reports of the loading of the image element of step 1320, for example, in a telemetry string. As discussed above, the telemetry string may detail the success of the loading of the image element. For image elements which are not able to load correctly, the tag may generate a separate telemetry pixel with an error code (e.g., detailing where the function failed) and an error message (e.g., detailing why the function failed). Based on a predetermined number of image elements not successfully loading (e.g., at least about 10%), the analysis network 104 may determine that a blacklist is installed.

In step 1340, the analysis network 104 may analyze the reports to detect the implemented blacklist. The analysis network 104 may compare the detected response of the web browser response in step 1320 to an expected response. The analysis network 104 may determine that the image elements from Blacklist X are observed, but not image elements from Blacklist Y. Therefore, the analysis network 104 may determine that the content blocking software is implementing Blacklist Y, and not Blacklist X. The analysis network 104 may then compare the implemented blacklists to a known array of implemented blacklist for one or more versions of content blocking software. Therefore, the analysis network 104 may detect and/or characterize the content blocking software based on the implemented blacklist. As discussed above, narrowing the analysis based a feature (e.g., most recently viewed image elements) may limit the required processing bandwidth to the most likely observed image elements of the at least one blacklist.

One or more of software modules incorporating the processes described above can be integrated into a computer system or non-transitory computer-readable media. Moreover, while illustrative embodiments have been described herein, the scope includes any and all embodiments having equivalent elements, modifications, omissions, combinations (e.g., of aspects across various embodiments), adaptations or alterations based on the present disclosure. Further, the steps of the disclosed processes can be modified in any manner, including by reordering steps or inserting or deleting steps.

What is claimed is:

1. A computerized process of detecting an implemented blacklist, the process comprising:
    downloading data from at least one blacklist by accessing a domain of the at least one blacklist;
    storing the domain of the at least one blacklist in a database with an online status;
    accessing a webpage from the domain of the at least one blacklist;
    receiving a scan of the accessed webpage for image elements of the at least one blacklist;
    compiling a list of the image elements from the at least one blacklist based on a feature of the image elements, wherein the feature is based on the image elements being observed on the webpage of an online domain;
    selecting an image element from the list of the image elements;
    receiving a report indicative of the selected image element successfully loading while a webpage is loaded on a web browser of a client device; and
    analyzing the report based on an expected response of the web browser to detect the implemented blacklist of the at least one blacklist.

2. The computerized process of claim 1, further comprising:
    storing the scanned image elements in the database with a timestamp of the scan,
    wherein the feature is further based on the timestamp being within a predetermined timeframe.

3. The computerized process of claim 2, further comprising:
    compiling frequency data based on the number of observations of the image elements during the predetermined timeframe,
    wherein the feature is further based on the frequency data.

4. The computerized process of claim 1, further comprising updating the online status of the domain based on the webpage not successfully loading.

5. The computerized process of claim 1, wherein the at least one blacklist comprises a plurality of blacklists.

6. The computerized process of claim 1, further comprising forwarding instructions to the client device to enable scanning of the web browser.

7. A system of detecting an implemented blacklist, comprising:
    at least one processor;
    at least one memory storing instructions that, when executed, cause the at least one processor to:
        download data from at least one blacklist by accessing a domain of the at least one blacklist;
        store the domain of the at least one blacklist in a database with an online status;
        access a webpage from the domain of the at least one blacklist;
        receive a scan of the accessed webpage for image elements of the at least one blacklist;
        compile a list of the image elements from the at least one blacklist based on a feature of the image elements, wherein the feature is based on the image elements being observed on the webpage of an online domain;
        select an image element from the list of the image elements;
        receive a report indicative of the selected image element successfully loading while a webpage is loaded on a web browser of a client device; and
        analyze the report based on an expected response of the web browser to detect the implemented blacklist of the at least one blacklist.

8. The system of claim 7, wherein the at least one memory further stores instructions that, when executed, cause the at least one processor to:

store the scanned image elements in the database with a timestamp of the scan,
wherein the feature is further based on the timestamp being observed within a predetermined timeframe.

9. The system of claim 8, wherein the at least one memory further stores instructions that, when executed, cause the at least one processor to:
compile frequency data based on the number of observations of the image elements during the predetermined timeframe,
wherein the feature is further based on the frequency data.

10. The system of claim 7, wherein the at least one memory further stores instructions that, when executed, cause the at least one processor to update the online status of the domain based on the webpage not successfully loading.

11. The system of claim 7, wherein the at least one blacklist comprises a plurality of blacklists.

12. The system of claim 7, wherein the at least one memory further stores instructions that, when executed, cause the at least one processor to forward instructions to the client device to enable scanning of the web browser.

13. A non-transitory computer-readable medium storing instructions which, when executed, cause one or more processors to perform a process of detecting an implemented blacklist, the process comprising:
downloading data from at least one blacklist by accessing a domain of the at least one blacklist;
storing the domain of the at least one blacklist in a database with an online status;
accessing a webpage from the domain of the at least one blacklist;
receiving a scan of the accessed webpage for image elements of the at least one blacklist,
compiling a list of the image elements from the at least one blacklist based on a feature of the image elements, wherein the feature is based on the image elements being observed on the webpage of an online domain;
selecting an image element from the list of the image elements;
receiving a report indicative of the selected image element successfully loading while a webpage is loaded on a web browser of a client device; and
analyzing the report based on an expected response of the web browser to detect the implemented blacklist of the at least one blacklist.

14. The non-transitory computer-readable medium of claim 13, wherein the process comprises:
storing the scanned image elements in the database with a timestamp of the scan,
wherein the feature is further based on the timestamp being within a predetermined timeframe.

15. The non-transitory computer-readable medium of claim 14, wherein the process comprises:
compiling frequency data based on the number of observations of the image element during the predetermined timeframe,
wherein the feature is further based the frequency data.

16. The non-transitory computer-readable medium of claim 13, wherein the process comprises updating the online status of the domain based on the webpage not successfully loading.

17. The non-transitory computer-readable medium of claim 13, wherein the at least one blacklist comprises a plurality of blacklists.

* * * * *